Feb. 12, 1952    A. O. HANSON    2,585,649
REACTION COMPARISON APPARATUS
Filed July 3, 1945    2 SHEETS—SHEET 1
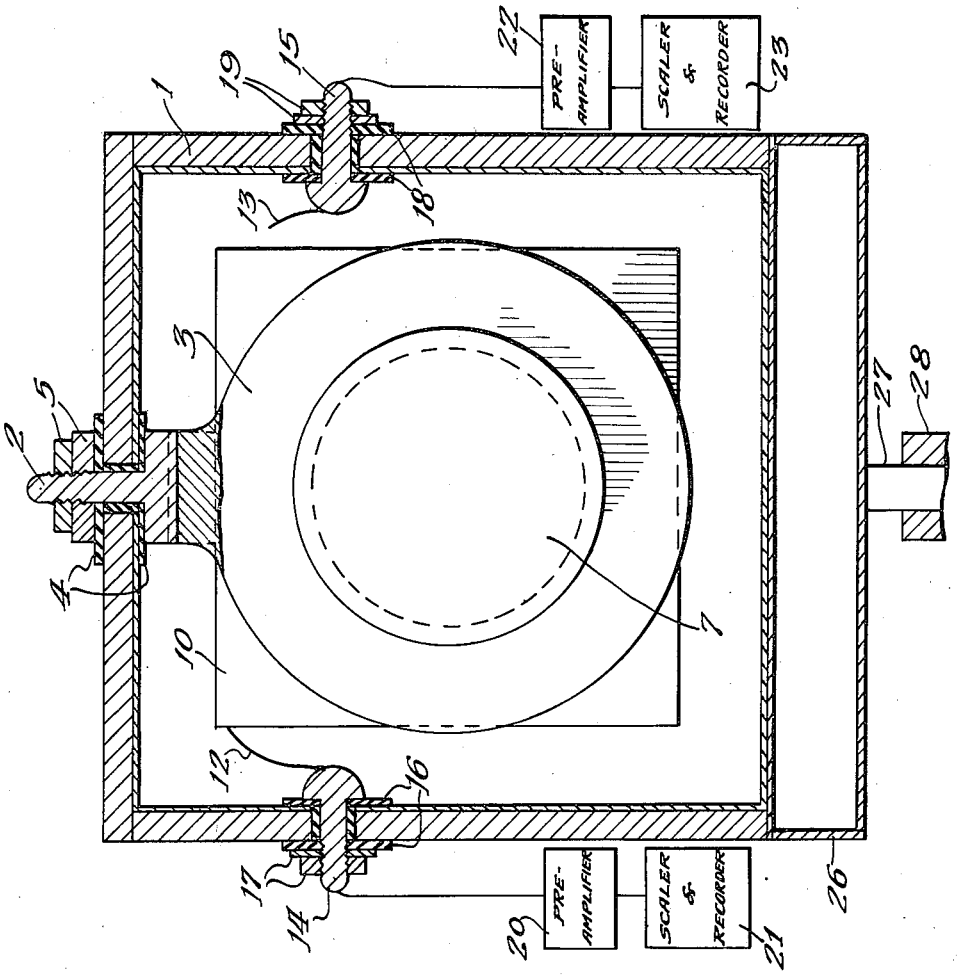
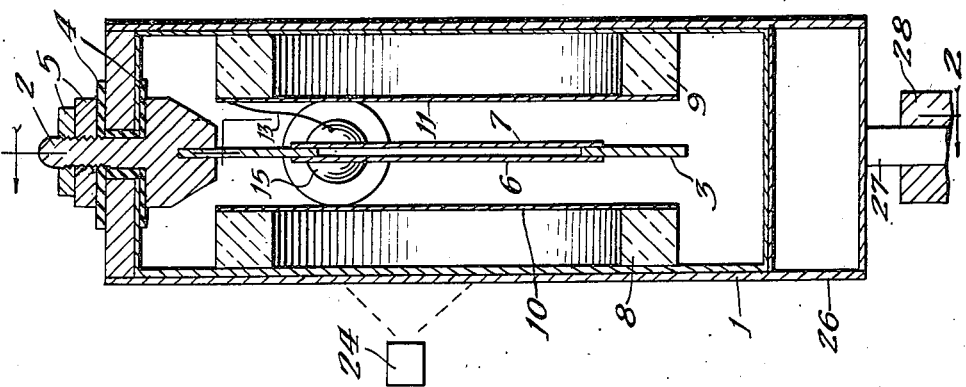

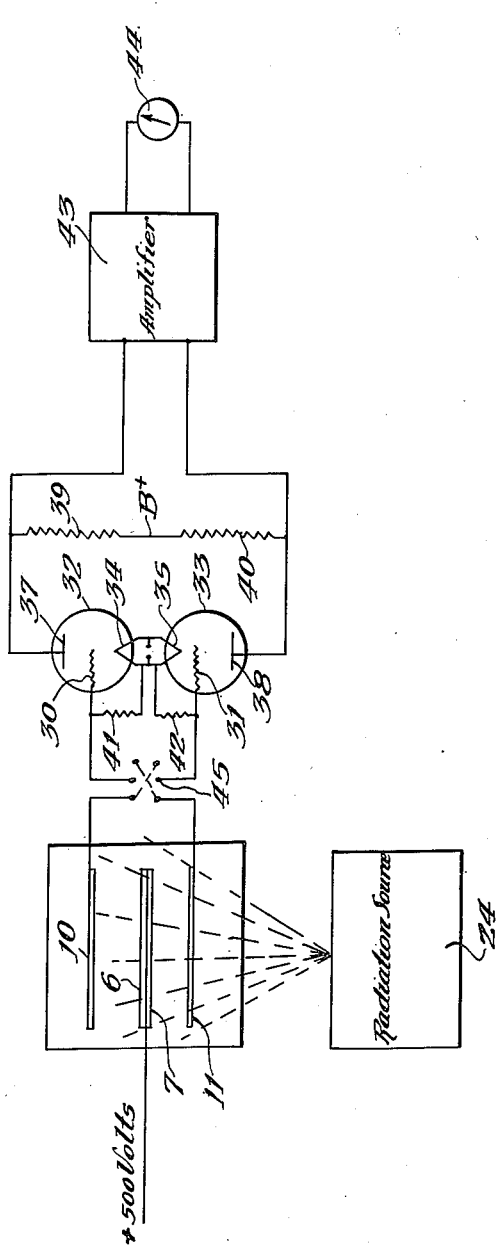

Patented Feb. 12, 1952

2,585,649

UNITED STATES PATENT OFFICE 2,585,649

REACTION COMPARISON APPARATUS

Alfred O. Hanson, Grand Forks, N. Dak., assignor to the United States of America as represented by the United States Atomic Energy Commission Application July 3, 1945, Serial No. 603,087

6 Claims. (Cl. 250—83.6)

The present invention relates to apparatus for comparing nuclear reactions induced in samples of the same or different materials when the materials are exposed to the same conditions of irradiation, such as neutrons, X rays, gamma rays, or fast electrons.

A common method of comparing induced nuclear reactions in samples of different materials is that of exposing one of the samples to a radiation source and noting the nuclear reaction by a counting rate meter or scaler-and-recorder, and then withdrawing the sample, substituting therefor a second sample, and again noting the counting rate while maintaining the radiated flux of the radiation source at a substantially constant value. This method is not very satisfactory since considerable difficulty is involved in maintaining the radiated flux at the same values for both measurements, hence errors are introduced by changes in radiation flux intensity.

An object of the present invention is to provide a novel apparatus and method for comparing nuclear reactions of two radioactive samples devoid of the above named disadvantages.

A more specific object of the present invention is to provide novel apparatus for making induced nuclear reaction comparisons of two samples of the same or different materials which permits irradiation of the two samples simultaneously by a radiation source so as to eliminate any possible errors due to changes in radiation intensity.

Another object of the invention is to provide a novel type ionization chamber including means for supporting two samples in back-to-back relationship so as to be irradiated simultaneously by an incident radiation beam to induce nuclear reactions, together with collecting and measuring means, so as to make it possible to accurately compare the nuclear reactions induced in the two samples.

Other objects and advantages will become apparent from a study of the following specification taken with the drawings wherein:

Fig. 1 is a central vertical transverse cross-sectional view of an ionization chamber embodying the principles of the present invention;

Fig. 2 is a cross-sectional view taken along line 2—2 of Fig. 1 partially in elevation and including a schematic diagram of the associated electric circuit; and Fig. 3 is a schematic diagram of a modified electrical circuit compared to that shown in Fig. 2.

Referring more particularly to Fig. 1, numeral 1 denotes a substantially rectangular chamber constructed of brass or other suitable material and filled with a suitable ionizable gas, such as argon, the end and top plates thereof being of greater thickness than the side and bottom plates. A lead-in conductor 2 is supported centrally of the top plate of chamber 1, and has rigidly secured thereto an annular plate 3 of electrically conducting material. Insulating washers 4 of mica or other suitable insulating material, together with screw-threaded nuts 5, are provided for forming a gas-tight insulated lead-in connection. Samples 6 and 7 whose nuclear reactions resulting from irradiation by a suitable external source are to be compared are in sheet form and secured on the opposite surfaces of plate 3. These samples may be of the same material or may be of different materials. For example, it may be desired to compare the fast (or slow) neutron fission cross-sections of the two samples.

Insulating rings 8 and 9 of glass, mica, or other suitable insulating material, preferably materials devoid of hydrogen, may be secured to the opposite inner walls of chamber 1 coaxially of annular plate 3 by Duco cement or other suitable fastening means. Secured to the inner confronting surfaces of rings 8 and 9 are two metallic, collecting electrodes 10 and 11, respectively, made of brass or other suitable electrically conducting material.

However, in the event that the effects of only fast neutrons are desired, such as in the case wherein it is desired to determine the comparative number of fissions produced by two different samples irradiated by fast neutrons, collecting electrodes 10 and 11 may be of cadmium or other material having a high cross-section for slow neutrons, thereby effectively absorbing the slow neutrons present. Likewise, the inner walls of chamber 1 may be coated with cadmium or other similar slow neutron absorbing material. On the other hand, if it is desired to compare the capture cross-sections for slow neutrons of two different samples, such as samples of $U^{235}$, no cadmium will be used. Likewise, nuclear reactions or radioactivity induced in the two samples by other radiations, such as X rays, gamma rays, fast electrons, and the like, may likewise be compared.

Connectors 12 and 13 have one of their ends secured to collecting electrodes 10 and 11, respectively, and the other of their ends electrically connected to lead-ins 14 and 15, respectively. Lead-in 14 is insulated from the wall of chamber 1 by insulating washers 16 and is held firmly in place by screw-threaded nuts 17. Likewise, lead-in 15 is insulatingly supported on wall 1 by means of insulating washers 18, and is rigidly held in place by screw-threaded nuts 19. Lead-in 14 is connected to a preamplifier 20 which is connected to a scaler-and-recorder 21, both indicated in block diagram form since they embody circuits well-known in the art which form no part of the present invention. Similarly, lead-in 15 is connected to a preamplifier 22 which is connected to a scaler-and-recorder 23.

A suitable high positive voltage, such as, for example, between +250 and +500 volts, or thereabouts, is applied to the lead-in 2. The ionization chamber is then subjected to a source of suitable radiations indicated schematically by numeral 24, such as, for example, a neutron source.

Assuming a neutron source is used and that a beam of neutrons falls upon samples 6 and 7 effecting fission thereof, the fission fragments, being highly charged ions moving at high speed, will cause ionization of the argon or other gas in chamber 1, thereby producing ion current pulses in the chamber 1 which are collected by collecting electrodes 10 and 11, respectively. Thereafter the ion current pulses are amplified by preamplifiers 20 and 22, and recorded by scaler-and-recorders 21 and 23, respectively.

It is preferable to place preamplifiers 20 and 22 immediately below casing 1, that is, within the confines of an adjoining chamber 26, thus providing minimum lengths of lead wires therebetween and effective electrostatic shielding.

In order to eliminate differences in induced activity that may result from passage of the particular activating radiation flux through one of the samples before impinging upon the other, it is desirable to provide means for rotating the ionization chamber through an angle of 180°. Such means may take the form of a shaft 27 rigidly secured to the bottom of the chamber 26, and journaled in a bearing 28.

By withdrawing plate 3 and the supported samples from chamber 1, rotating plate 3 through an angle of 180°, then reinserting it in the chamber so as to reverse the respective positions of the samples, and observing in both directions, it is possible to eliminate errors due to differences in amplifier behavior, slight geometrical effects and to a certain extent, differences due to the dependence of the counting rate on the direction of observation.

By noting the readings of the scaler-and-recorders 21 and 23, the ratio of the nuclear activities induced in the samples may be noted, such as, for example, the ratio of the fission yields resulting from neutron absorption.

If it is desired merely to know the difference of induced activity of the samples as they are being activated by the same radiation source, the differential circuit shown in Fig. 3 may be used. In such circuit, collecting electrodes 10 and 11 are connected to the input grids 30 and 31 of tubes 32 and 33, respectively, of a preamplifier circuit. These tubes may have interconnected cathodes 34 and 35 energized by a suitable low voltage energizing source of potential (not shown). Anodes 37 and 38 of tubes 32 and 33 are connected to resistors 39 and 40, respectively, which resistors have their opposite terminals connected to the B+ terminal. Cathode biasing resistors 41 and 42 are provided for tubes 32 and 33, respectively. Amplifier 43 of any suitable well-known type, shown in block diagram form, amplifies the output from the above described preamplifier circuit. A microammeter 44, preferably one having its zero point at the center with its pointer movable in either direction, is used to measure the output of amplifier 43.

In the event the induced activity of sample 6 is greater than that of sample 7 more current will flow through tube 32 than through tube 33 of the differentially connected preamplifier circuit, and hence the meter 44 will deflect in one direction by an amount proportional to the difference in induced activity. If, on the other hand, the induced activity of sample 7 is greater than that of sample 6, meter 44 will deflect in the opposite direction. If the induced activities of samples 6 and 7 are identical, meter 44 will deflect in neither direction but will merely read zero, indicating that the ratio is one-to-one.

In order to eliminate possible errors resulting from slight differences in the amplification factors of the respective preamplifier tubes 32 and 33, a reversing switch 45 is provided for the purpose of connecting collecting electrode 10 to grid 31 and collecting electrode 11 to grid 30 during part of the reading.

Thus, it will be seen that there has been provided a relatively simple and efficient ionization chamber for accurately comparing nuclear reactions induced in samples of the same or different materials when simultaneously exposed to a radiation source, and wherein errors, which might otherwise be caused as a result of changes in radiation intensity, are eliminated.

Various modifications within the scope of the present invention may be readily suggested to those skilled in the art after having had the benefit of the teachings of the present specification. Therefore, the invention should not be limited except insofar as set forth in the following claims.

I claim:

1. In combination, an ionization chamber, a centrally disposed insulated lead-in conductor extending therethrough, an annular member supported centrally in said ionization chamber by said lead-in conductor separating the ionization chamber into two portions and adapted to support a pair of sheet-like samples centrally of said annular member in back-to-back relationship, one sample confronting each portion of the ionization chamber, so as to induce radioactivity in both samples when subjected to a radiation source disposed axially of said annular member, a collecting electrode insulatingly supported in each portion of the ionization chamber in confronting relationship with the adjacent sample support in said portion of the ionization chamber, means for applying a source of electric potential between each sample and the electrode in that portion of the chamber to produce ion currents as the result of induced radioactivity of said samples, and electrical means for separately detecting and measuring said ion currents.

2. An ionization chamber including an electrically conducting annular support disposed centrally in said chamber separating the chamber into two portions and adapted to support a pair of sheet-like samples in back-to-back relationship, one sample confronting each portion of the chamber, a pair of insulating rings supported coaxially of said annular support, in spaced relationship, one of said rings being mounted in each portion of the chamber, a pair of sheet-like collecting electrodes, one supported by each ring in confronting relationship with one of said samples, means for applying a source of electrical potential between said electrodes and said support while irradiating said sources by a radiation source coaxially of said annular support, and means for separately detecting the ion currents collected by said electrodes resulting from nuclear reactions induced in said samples by said radiation source.

3. Apparatus for comparing the nuclear reactions of two different samples irradiated by the same fast neutron flux, comprising, in combination, a gas-tight chamber internally lined with cadmium, an insulating support plate projecting centrally into said chamber separating the chamber into two portions for supporting two parallel sheets of said two different samples in back-to-back relationship, said plate supporting one sample confronting one portion of the chamber and the other sample confronting the other portion of the chamber, a high potential source connected to said samples, a pair of cadmium collectors mounted on and insulated from the walls of said chamber, one of said collectors being mounted in each portion of the chamber, each collector confronting one of said samples so as to collect ion current impulses caused by fission fragments resulting from fast fission induced in said samples by said flux, amplifying and detecting means connected to said metallic collectors for detecting and comparing the number of pulses resulting from the activity of said samples.

4. Apparatus for comparing the nuclear reactions of a plurality of radioactive samples, comprising an ionization chamber, support means mounted within the chamber to separate said chamber into a plurality of portions and to support the samples with a single sample supported in each portion of the chamber contiguous to the sample in an adjacent portion of the chamber, at least one collecting electrode positioned within each portion of the chamber, said electrode being mounted in confronting relationship with the sample support means, and means for applying an electrical potential between the sample support means and each collecting electrode.

5. Apparatus for comparing the nuclear reactions of a plurality of radioactive samples comprising, an ionization chamber, sample support means mounted within the ionization chamber separating the ionization chamber into two portions and supporting a radioactive sample confronting each portion of the chamber contiguous to the sample in the other portion, a pair of collecting electrodes, means for insulatingly supporting one of said electrodes in each portion of the chamber, and means for applying an electrical potential between the samples and the electrodes.

6. Apparatus for comparing the nuclear reactions of a plurality of radioactive samples comprising, the elements of claim 4 and an internal lining within the ionization chamber consisting of a material that absorbs slow neutrons.

ALFRED O. HANSON.

REFERENCES CITED

The following references are of record in the file of this patent:

UNITED STATES PATENTS

| Number | Name | Date |
|---|---|---|
| 2,127,193 | Toulmin | Aug. 16, 1938 |
| 2,161,985 | Szilard | June 13, 1939 |
| 2,288,718 | Kallmann | July 7, 1942 |

OTHER REFERENCES

Hagiwara, Rev. Physical Chem. Japan, vol. 13, pp. 145–150 (1939).

Phy. Rev. 55, 416–417 (1939); 55, 511–512 (1939); 57, 546 (1940); 57, 748 (1940).

Kennedy et al., "Component Analysis of Small Uranium Samples," pp. 1–26, MDDC–973, U. S. Atomic Energy Commission, Tech. Information Div., Oak Ridge Operations, AEC, Oak Ridge, Tenn., 11–19–48—850—12994. Date of Manuscript, Mar. 26, 1943; Date Declassified, May 23, 1947.